Nov. 8, 1960 A. W. TEDESCO 2,959,206
CONTROL MECHANISM FOR RECLINING SEAT BACK
Filed Oct. 2, 1958 2 Sheets-Sheet 1

INVENTOR.
ANTON W. TEDESCO
BY Carl J. Barbee
ATTORNEY

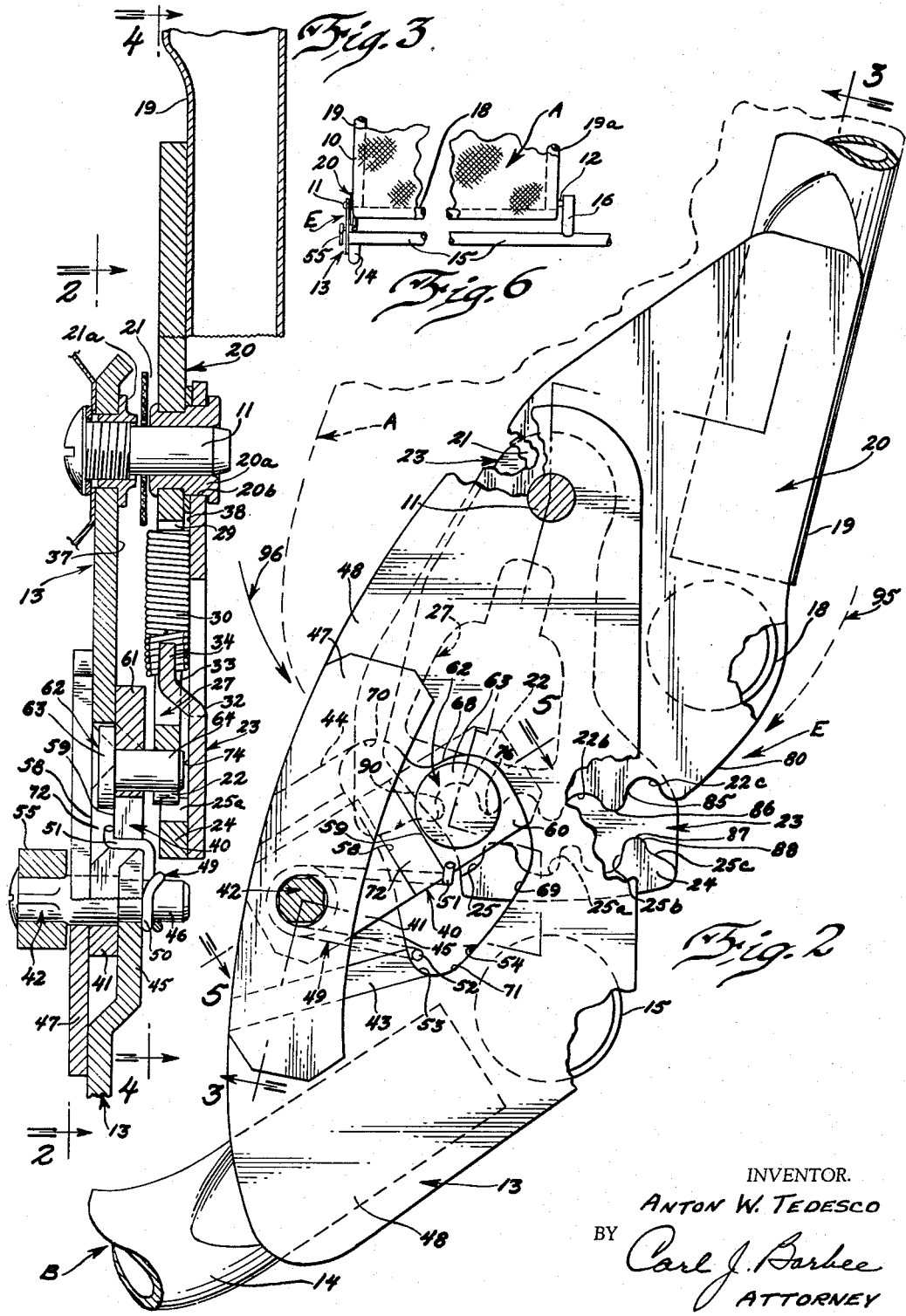

United States Patent Office 2,959,206
Patented Nov. 8, 1960

2,959,206

CONTROL MECHANISM FOR RECLINING SEAT BACK

Anton W. Tedesco, Detroit, Mich., assignor, by mesne assignments, to American Motors Corporation, Detroit, Mich., a corporation of Maryland Filed Oct. 2, 1958, Ser. No. 764,922

8 Claims. (Cl. 155—8)

The invention relates to seat backs of the type which can be adjusted from an upright sitting position to a horizontal or "bed" position and to several selected intermediate positions of reclination.

The invention has particular reference to the control mechanism which is employed during the raising or lowering of the seat back.

An object of the invention is to provide a control mechanism which is simplified with a view to effecting cost reduction.

A specific object is to provide an improved and simplified indexing and latching mechanism.

Other objects and advantages will be apparent from the ensuing specification and appended drawings in which:

Figure 2 is a fragmentary side elevational detail view of the mechanism by which seat back reclination is controlled—the view being taken on the line 2—2 of Figure 3.

Figure 3 is a fragmentary sectional view taken on the irregular line 3—3 of Figure 2.

Figure 6 is a fragmentary detail rear view on a reduced scale of the seat back.

Figure 1:
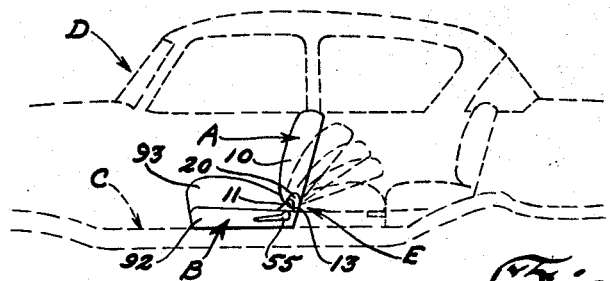
Figure 1 is a side elevational view on a reduced scale of a seat assembly for an automobile employing the novel control mechanism and illustrating how the seat back is lowered to a horizontal position.
Figure 5:
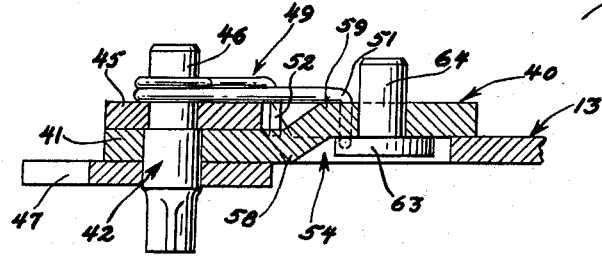
Figure 5 is a fragmentary sectional detail view taken on the line 5—5 of Figure 2.

In general, the invention contemplates a seat assembly in which the seat back A is hingedly carried on a seat frame B which is supported on the floor C of an automobile D—the seat back being capable of being lowered to the horizontal position as shown in dotted lines in Figure 1. The seat back, at one of its ends 10 is carried on a hinge pin 11 and at its other end is carried on a hinge pin 12. The hinge pin 11 extends through and is carried by the support bracket 13 which in turn is rigidly secured to the seat frame members 14 and 15. The hinge pin 12 is carried by a suitable support pillar 16 which may be anchored to the seat frame member 15. Thus the seat back may be swung from the upright position (as shown in solid lines in Figure 1) to any of several intermediate reclining positions and then on to a horizontal or "bed" position (as shown in Figure 1 in dotted lines). The lowering of the seat back is subject to the actuation of the controlling mechanism, identified generally by the letter E as shown in detail in Figures 2, 3, 4 and 5.

The seat frame may include a rear frame member 15 and spaced side members 14 (only one of these being shown in Figure 2) and the seat back may include a lower frame member 18 and spaced upright frame members 19 and 19a at opposite ends of the seat back.

The support bracket 13 has its inner face secured, as by welding, to the frame members 14 and 15 and the seat back carrying bracket 20 has its inner face secured, as by welding, to the seat back frame members 18 and 19. The hinge pin 11 extends through the support bracket 13 and is rotatably received in the bushing 20a in the seat back carrying bracket 20. The bracket 20 may be in the form of a stamping provided at its underneath edge with a succession of notches 22, 22a, 22b, and 22c for reasons to be explained hereinafter. An indexing bracket 23 is rotatably carried on the annular shoulder 20b of bushing 20a and is free for swinging movement relative to the seat back carrying bracket 20 within certain limits. A washer 21 fabricated of oil impregnated material is carried on pin 11 between the bushing 20 and the nut 21a eliminating the need of lubricant at this juncture and facilitating the free swinging movement of the indexing bracket. The indexing bracket has a segment 24 secured to one face thereof and at the lower edge thereof. The segment is provided with notches 25, 25a, 25b, and 25c. It will be noted that the segment projects laterally from the side face of bracket 23 so as to underlie the notches in the seat back carrying bracket 20.

Figure 4:
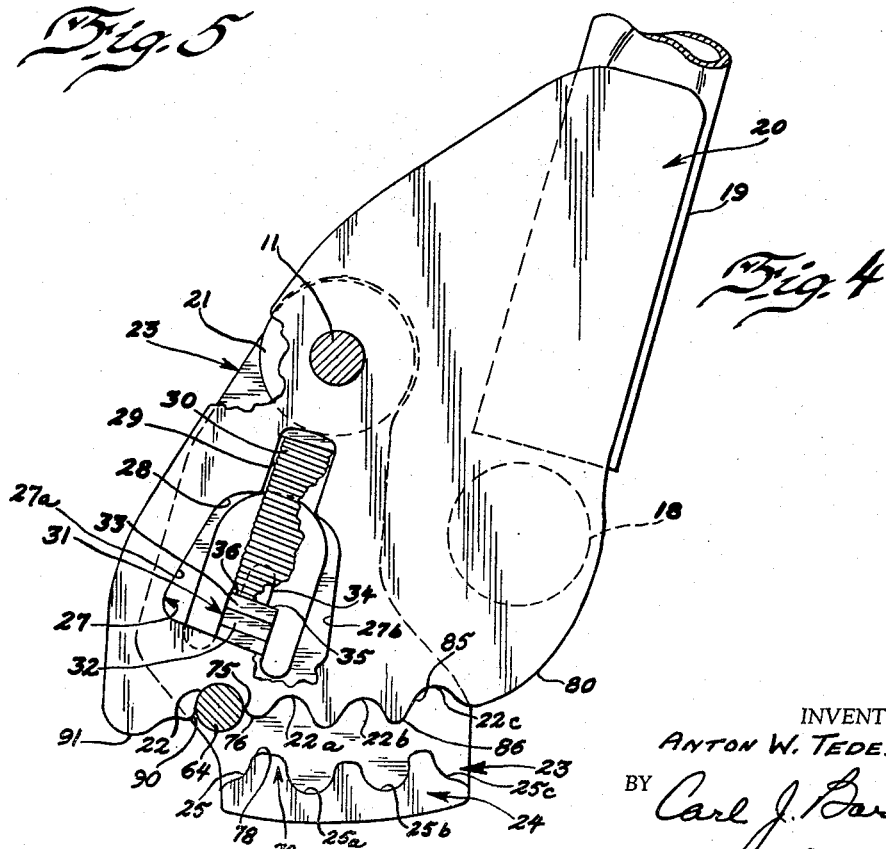
Figure 4 is a fragmentary detail view taken on the line 4—4 of Figure 3.

Referring to Figure 4 it will be noted that the seat back carrying bracket 20 is provided with an opening identified generally by the numeral 27 of considerable width at its lower end and tapering to a narrower width at the upper end 28. The extreme upper end of the opening is further narrowed to form a pocket 29 for receiving the upper end of a coil spring 30. The indexing bracket 23 has a tongue 31 struck therefrom, such tongue being bent at 32 and bent again at 33 so that the end portion 34 of the tongue lies in the plane of the seat back carrying bracket 20, as best viewed in Figure 3. The free end 34 of the tongue is narrowed in width so as to project into the interior of the spring 30 and so as to provide the shoulders 35 and 36 against which the lower end of the spring 30 rests.

The inner face 37 of the upper end of support bracket 13 in conjunction with the inner face 38 of the upper end of the indexing bracket 23 forms the side walls of the pocket into which the upper end of the spring 30 projects. The range of movement of the indexing bracket (about the axis of pin 11) relative to the seat back carrying bracket is determined by the contacting of the tongue 31 with the opposite side walls 27a and 27b of the opening 27. When pressure is exerted on the indexing bracket causing same to swing about the axis of pin 11, the spring 30 is flexed sideways from the normal rectilinear path of its axis (as shown in Figure 4) and a release of the pressure on the indexing bracket results in the spring 30 swinging the indexing bracket back to the neutral position as shown in Figure 4. A more detailed explanation of the functioning of the indexing bracket will be set forth hereinafter. A latch identified generally by the numeral 40 includes the latch arm which has one end thereof 41 non-rotatively mounted on the pin 42, the pin being rotatively carried by the support bracket 13 and plate 47. The support bracket 13 is bent at 43 and 44 to provide a laterally offset portion 45 through which the free end 46 of the pin 42 projects. Elongated plate 47 is welded or otherwise secured to the outer face 48 of the support bracket and spans the recessed portion 45 providing a pocket within which the end 41 of the latch arm is movably received. A torsion spring 49 has its eye portion 50 wrapped around the end 46 of the pin 42 and one end 51 of the torsion spring is hooked under the latch arm 40 and the other end 52 is bent to overhang the wall 53 of the opening 54 which is formed in the support bracket 13. Thus the latch arm is continuously urged to swing upwardly into the position as shown in Figure 2 about the axis of pin 42. The handle 55 is non-rotatively mounted on the end of pin 42 and an upward pull on the handle (as best shown in Figure 1) rotates the pin 42 and the latch arm 40 so that the latch arm swings downwardly when viewing Figure 2. The latch arm is bent at 58 and bent again at 59 so that the free end 60 thereof lies in a plane which is offset with reference to the plane of the end portion 41.

A pin identified generally by the numeral 62 is secured to the latch arm and has an enlarged head portion 63 at one end and a shank portion 64 at the other end which functions as the latch element or pawl as will be explained more fully hereinafter. The support bracket 13 is provided wtih the irregularly shaped opening 54 which has the opposing wall portions 68 and 69 which are contacted by the head portion 62 of the latch arm pin for limiting the swinging movement of the latch arm about the axis of pin 42 (to be explained more fully hereinafter). The extended portions 70 and 71 of the opening 54 accommodate the bent portion 72 of the latch arm during the swinging thereof. The end 64 of the pin 62 terminates short of the inner face 74 of the indexing bracket and is alternately received in one of the notches in the seat back carrying bracket or one of the notches of the segment 24 during actuation of the latch arm.

Operation

Assuming that the seat back is in the upright position as shown in solid lines in Figure 1, then the latch element 64 will be received within notch 22 of the seat back carrying bracket under the influence of spring 49. The position of the seat back is inclined slightly from the vertical and gravity is tending to cause the seat back to swing rearwardly toward the horizontal position—this, however, being prevented because of the engagement of the rear wall 75 of the notch 22 bearing against the latch element 64. Since the movement of the seat back is always in an arcuate path generated from the axes of the hinge pins 11 and 12, it is necessary that the configuration and position of the rear wall of notch 22 (as well as the rear walls of the succeeding notches in the seat back carrying bracket) be such with reference to a line drawn through the axes of pins 42 and 62 and with reference to the line of force 95 that the axis of latch element 64 will be beyond "dead center" so that when an occupant of the seat leans back against the seat back, the latch element will not be pushed out of the notch 22. Instead the seat back carrying bracket (under the load of the seat occupant) will be tending to force the latch arm still further upwardly about the axis of pin 42—any possible further upward movement of the latch arm, being prevented by engagement of the head portion 62 with the suport bracket wall 68. It will be noted that the load imposed on the seat back by the seat occupant is absorbed entirely at that end of the seat back where the control mechanism E is located, since the other end of the seat back is freely hinged on the hinge pin 12. If it is desired to lower the seat back to the second station of reclination, then the seat occupant grasps handle 55 exerting an upward pull on same (it is also desirable that the seat occupant lean forwardly so as to remove the load on the seat back prior to exerting the upward pull on handle 55). This causes the latch arm 40 to swing downwardly until the latch element 64 is received in the notch 25 of the indexing bracket 23. As soon as the latch element is clear of the peak 76 of the tooth which is formed between the successive notches 22 and 22a, then the seat back is free, under the influence of gravity, to continue swinging rearwardly and downwardly until the tongue 31 is engaged by the bracket wall 27b. The latch element 64 being received in notch 25, causes the indexing bracket to remain stationary while the seat back continues swinging rearwardly within the range of movement permitted by the span of the opening 27 (that is, until wall 27b engages tongue 31). At this stage the spring 30 has been flexed sideways and the peak 76 has moved sufficiently far forwardly with reference to the leading corner 78 of tooth 79 to permit the latch element 64 to proceed into the second notch 22a when the manual lifting pressure on handle 55 is released (the spring 50, of course, causing the latch arm to spring upwardly again until the latch element is received within notch 22a). Viewing Figure 4, it will be noted that the diameter of the latch element 64 is greater than the gap between tooth peak 76 and the peak of tooth 79, thereby necessitating swinging movement of the indexing bracket to permit the gap to become great enough for the latch element to proceed into the second notch 22a. After the latch element has proceeded into notch 22a, then the spring 30 causes the indexing bracket to swing about the axis of pin 11 back to the neutral position as shown in Figure 4 whereupon the notch 25a will be in an appropriate position to permit the latch element to enter same upon the next upward application of pressure on handle 55.

When the latch element 64 has reached the 4th station represented by notch 22c, then the next application of upward pressure on handle 55 will cause the latch element to ride along the arcuate edge 80 of the seat back carrying bracket until the seat back is in fully horizontal position, as shown in dotted lines in Figure 1. Any upward pressure on the handle 55 at this time would simply cause the head portion 63 of the latch element to engage the wall 69 of the support bracket. Consequently, the latch arm with its latch element is always in proper position for coacting with the notches in the seat back carrying bracket and the notches in the indexing bracket because of the limited range of swinging movement of the latch arm assured by the walls 68 and 69 in cooperation with the latch element head 63. In raising the seat back from horizontal position to the upright position shown in Figure 1, it is only necessary to grasp the upper end of the seat back and manually pull upwardly on same while the latch element 64 ratchets back and forth between the sets of notches. No attention is given to the handle 55 when raising the seat back from horizontal to upright position.

During the upward movement of the seat back, the action of the latch arm is as follows. The latch element 64 follows the arcaute edge 80 until it pops into notch 22c (under the influence of spring 50). Continued upward pressure on the seat back then causes the forward wall 85 of notch 22c to commence forcing the latch element out of notch 22c. The position and configuration of the forward wall of each of the notches 22, 22a, 22b and 22c is such with reference to the axes of pins 42 and 62 and with reference to the line of force 96 that the axis of latch element 64 is below "dead center" whereby upward pressure on the seat back causes the latch element to automatically pop out of the successive notches. As the latch element is coming out of notch 22c, the gap between the peak 86 and the peak 87 is normally insufficient to permit passage of the latch element thereby causing the latch element to engage the peak 87 (toward the rearward corner 88 thereof) and the indexing bracket is swung forwardly about the axis of pin 11 until the tongue 31 engages the forward wall 27a of the opening in the seat back carrying bracket. At this stage, the peak 86 has moved sufficiently far rearwardly with reference to peak 87 that the gap is large enough to permit the latch element to pass over the peak 86 and on into notch 22b. At this stage, the indexing bracket is free of the latch element and swings (under the inducement of spring 30) back to the neutral position as shown in Figure 4. Continued upward pressure on the seat back causes the latch element to swing back and forth between the sets of notches, automatically, until the latch element reaches notch 22. In the instant application, it is desirable to prevent the seat back from being swung forwardly beyond the upright position shown in Figure 1, consequently, the forward wall of notch 22 is continued downwardly with a tongue portion 90 which projects beyond "dead center," that is, below a line drawn through the axes of pins 42 and 62 and when the latch element reaches notch 22, the projecting tongue 90 prevents the latch element from popping out of this notch even though continued upward pressure is exerted on the seat back. The tongue 90 thus serves as a stop to prevent any further forward movement of the seat beyond the upright position as shown in solid lines in Figure 1. An additional tongue 91 serves as a secondary or safety stop in event tongue 90 should fail to function as a stop.

Referring to Figure 1, I have shown a shield 92 extending along side the end of the removable seat cushion 93 and exteriorly of the seat frame B. The shield serves to cover up the working parts (as indicated in Figure 1) and details of the shield are not included in the remaining figures of the drawings.

I claim:

1. A seat assembly comprising: a supporting frame forming the base of the seat assembly; a seat back hingedly carried by the frame for swinging movement from an upright to a reclined position relative to the frame; latching mechanism having interconnection between the seat back and seat frame for effecting a controlled raising and lowering of the seat back relative to the frame; said latching mechanism including a first bracket secure with the seat back and having an opening therein and an indexing bracket having a tongue portion and being hingedly carried by the frame for limited swinging movement relative to the first bracket; a latch mounted on the frame for movement between the brackets; said first bracket having successive latch receiving surfaces for holding the seat back in a selected position of reclination whenever the latch is received in one of such surfaces; said indexing bracket having latch receiving surfaces in proximity to and exposed toward the latch receiving surfaces in the first bracket and serving for holding the seat back within a limited range of movement whenever the latch is received in one of such surfaces, said latch being positioned between the latch receiving surfaces on the first bracket and the latch receiving surfaces on the indexing bracket; control means for moving the latch from one of the latch receiving surfaces of the first bracket into engagement with one of the latch receiving surfaces on the indexing bracket whereby gravity effects a lowering of the seat back during movement of the latch from the first bracket to the indexing bracket and whereby lowering of the seat back is arrested when the latch is engaged in one of the latch receiving surfaces on the indexing bracket and means for aligning the latch receiving surfaces on the indexing bracket with reference to the latch receiving surfaces on the first bracket, such last mentioned means including a coil spring having one end telescopically received on the tongue portion of the indexing bracket and its other end extending beyond the outermost end of the tongue portion and received within a portion of the opening in the first bracket, whereby to continuously urge the indexing bracket toward a netural position relative to the first bracket.

2. A seat assembly comprising: a supporting frame forming the base of the seat assembly; spaced supports carried by the frame; a seat back hingedly carried by the supports for swinging movement from an upright to a reclined position relative to the frame; latching mechanism having interconnection between the seat back and seat frame for effecting a controlled raising and lowering of the seat back relative to the frame; said latching mechanism including a first bracket secure with the seat back and having an opening therein and an indexing bracket hingedly carried by the frame for limited swinging movement relative to the first bracket; a latch mounted on one of the supports for movement between the brackets; said first bracket having successive latch receiving surfaces for holding the seat back in a selected position of reclination whenever the latch is received in one of such surfaces; said indexing bracket having latch receiving surfaces in proximity to and exposed toward the latch receiving surfaces in the first bracket and serving for holding the seat back within the limited range of movement whenever the latch is received in one of such surfaces, said latch being positioned between the latch receiving surfaces on the first bracket and the latch receiving surfaces on the indexing bracket; control means for moving the latch from one of the latch receiving surfaces of the first bracket into engagement with one of the latch receiving surfaces on the indexing bracket whereby gravity effects a lowering of the seat back during movement of the latch from the first bracket to the indexing bracket and whereby lowering of the seat back is arrested when the latch is engaged in one of the latch receiving surfaces on the indexing bracket and means for aligning the latch receiving surfaces on the indexing bracket with reference to the latch receiving surfaces on the first bracket, such last mentioned means including a tongue formed on the indexing bracket and being bent so as to project into the plane of the first bracket within the confines of the opening in such bracket; a coil spring having one end telescopically positioned on the tongue and the other end received within a portion of the opening in the first bracket, whereby the spring continuously urges movement of the indexing bracket toward a neutral position relative to the first bracket.

3. A seat assembly comprising: a supporting frame forming the base of the seat assembly; first and second spaced supports carried by the frame; a seat back hingedly carried by the supports for swinging movement from an upright to a reclined position relative to the frame; latching mechanism having interconnection between the seat back and seat frame for effecting a controlled raising and lowering of the seat back relative to the frame; said latching mechanism including a first bracket secure with the seat back and an indexing brackect hingedly carried by the frame for limited swinging movement relative to the first bracket; the first support being situated in face to face fashion relative to the first bracket and having an opening therethrough; a latch swingably mounted on the first support and including a latch arm having a first portion lying adjacent one side face of the first support and a second portion offset relative to the first portion and lying adjacent the side face of the first support opposite from the side face on which the first portion lies; an abutment on either side of the second portion of the latch arm, one of such abutments serving as a latch element for movement between the first bracket and the indexing bracket and the other abutment being adapted for contacting opposing walls of the first support opening to limit the extent of the swinging movement of the latch arm; said first bracket having successive latch element receiving surfaces for positively holding the seat back in a selected position of reclination whenever the latch element is received in one of such surfaces; said indexing bracket having latch element receiving surfaces in proximity to and exposed toward the latch element receiving surfaces in the first bracket and serving for positively holding the seat back within a limited range of movement whenever the latch element is received in one of such surfaces, said latch element being positioned between the latch element receiving surfaces on the first bracket and the latch element receiving surfaces on the indexing bracket; control means for moving the latch element from one of the latch element receiving surfaces of the first bracket into engagement with one of the latch element receiving surfaces on the indexing bracket whereby gravity effects a lowering of the seat back during movement of the latch element from the first bracket to the indexing bracket.

4. Apparatus as set forth in claim 3 wherein a torsion spring has one end in contact with a wall of the first support opening and another end in contact with the latch arm, whereby to continuously urge the latch arm in a direction wherein the latch element is in contact with one of the latch element receiving surfaces on the first bracket.

5. Apparatus as set forth in claim 2 wherein the side face of one of the supports lies adjacent one side face of the first bracket and a side face of the indexing bracket lies adjacent the opposite side face of the first bracket, the side faces of the support and of the indexing bracket overlie a portion of the first bracket opening thereby defining a pocket within which one end of the spring is received.

6. An indexing apparatus comprising a plate having an opening cut therein; a second plate mounted in face to face fashion relative to the first plate and adjacent thereto, said second plate being mounted for limited swinging movement relative to the first plate, said second plate having a tongue secure therewith and the tongue being bent so as to project into the plane of the first plate within the confines of the opening in the first plate, whereby the swinging movement of the second plate relative to the first plate is limited as a result of the tongue striking the side walls of the opening in the first plate; a coil spring having one end telescopically mounted on the tongue and its other end extending beyond the outermost end of the tongue and received between opposing walls of the first plate opening whereby to continuously urge the second plate toward a neutral position relative to the first plate.

7. Apparatus as set forth in claim 6 wherein the opening in the first plate is reduced at one end to provide a pocket into which the spring is received and the second plate has a wall portion adjacent to and overhanging the reduced portion of the first plate opening, thereby providing a retaining wall for the spring.

8. A seat assembly comprising: a supporting frame forming the base of the seat assembly; first and second spaced supports carried by the frame; a seat back hingedly carried by the supports for swinging movement from an upright to a reclined position relative to the frame; latching mechanism having interconnection between the seat back and seat frame for effecting a controlled raising and lowering of the seat back relative to the frame; said latching mechanism including a first bracket secure with the seat back and an indexing bracket hingedly carried by the frame for limited swinging movement relative to the first bracket; the first support being situated in face to face fashion relative to the first bracket and having an opening therethrough, said first support having a laterally offset portion adjacent the opening; a latch swingably mounted on the first support and including a latch arm having a first portion received in the laterally offset portion of the first support and a second portion offset relative to the first portion; an abutment on either side of the second portion of the latch arm, one of such abutments serving as a latch element for movement between the first bracket and the indexing bracket and the other abutment being adapted for contacting opposing walls of the first support opening to limit the extent of the swinging movement of the latch arm; said first bracket having successive latch element receiving surfaces for positively holding the seat back in a selected position of reclination whenever the latch element is received in one of such surfaces; said indexing bracket having latch element receiving surfaces in proximity to and exposed toward the latch element receiving surfaces in the first bracket and serving for positively holding the seat back within a limited range of movement whenever the latch element is received in one of such surfaces, said latch element being positioned between the latch element receiving surfaces on the first bracket and the latch element receiving surfaces on the indexing bracket; control means for moving the latch element from one of the latch element receiving surfaces of the first bracket into engagement with one of the latch element receiving surfaces on the indexing bracket whereby gravity effects a lowering of the seat back during movement of the latch element from the first bracket to the indexing bracket.

References Cited in the file of this patent

UNITED STATES PATENTS

| | | |
|---|---|---|
| Re. 24,528 | Borisch | Sept. 2, 1958 |
| 2,738,954 | Du Bois | Mar. 20, 1956 |